United States Patent
Drewes et al.

(10) Patent No.: US 6,374,680 B1
(45) Date of Patent: Apr. 23, 2002

(54) CAPACITIVE PRESSURE SENSOR OR CAPACITIVE DIFFERENTIAL PRESSURE SENSOR

(75) Inventors: Ulfert Drewes, Müllheim; Andreas Rossberg, Bad Säckingen; Elke Schmidt, Schopfheim; Frank Hegner, Loerrach; Thomas Velten, Wehr, all of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/511,723

(22) Filed: Feb. 21, 2000

Related U.S. Application Data
(60) Provisional application No. 60/131,157, filed on Apr. 27, 1999.

(30) Foreign Application Priority Data

Mar. 24, 1999 (EP) ............................................. 99105939

(51) Int. Cl.[7] ................................................. G01L 9/12
(52) U.S. Cl. ........................................... 73/718; 73/724
(58) Field of Search ........................ 73/724, 718, 715, 73/723, 717; 361/283.4, 283

(56) References Cited

U.S. PATENT DOCUMENTS

| | | | |
|---|---|---|---|
| 4,829,826 A | 5/1989 | Valentin et al. | |
| 4,944,187 A | * 7/1990 | Frick et al. | ................... 73/718 |
| 5,050,034 A | 9/1991 | Hegner et al. | |
| 5,050,035 A | 9/1991 | Hegner et al. | |
| 5,334,344 A | 8/1994 | Hegner et al. | |
| 5,400,489 A | * 3/1995 | Hegner et al. | .............. 29/25.41 |
| 5,539,611 A | 7/1996 | Hegner et al. | |
| 5,665,921 A | 9/1997 | Gerst et al. | |
| 5,670,063 A | 9/1997 | Hegner et al. | |
| 5,712,428 A | 1/1998 | Schleiferbock | |
| 5,954,900 A | 9/1999 | Hegner et al. | |
| 5,992,240 A | * 11/1999 | Tsuruoka et al. | .............. 73/718 |

FOREIGN PATENT DOCUMENTS

| | | |
|---|---|---|
| CA | 2211471 | 1/1998 |
| DE | 3404262 | 9/1994 |
| EP | 0 516 579 | 4/1992 |
| EP | 0 849 576 | 6/1998 |
| GB | 2 125 167 | 2/1984 |

* cited by examiner

*Primary Examiner*—Benjamin R. Fuller
*Assistant Examiner*—Abdullahi Aw-Musse
(74) *Attorney, Agent, or Firm*—Bose McKinney & Evans LLP

(57) ABSTRACT

The electrodes of these pressure or differential pressure sensors are formed using a technique other than silk-screen printing or sputtering: The pressure sensor (10) has a substrate (1) and a first major surface (11), a second major surface (12) and a circumferential surface (13. A plate-shaped electrode (14) of electrically conductive material is secured in a recess (15) in the major surface (11) in a high-pressure-resistant and high-vacuum-tight manner by a joining material (16). A through connection (17) is provided from the electrode (14) through the substrate (1) to the major surface (12) or the circumferential surface (13). A diaphragm (2) of ceramic, glass, or single-crystal material is attached to the substrate (1) outside the recess (15) along a joint (18) by a joining material (26), and forms itself a further electrode or is covered, on a surface facing the electrode (14), with a further electrode (24) which is contacted through the joint (18). Substrate and diaphragm consist of a ceramic, glass, or single-crystal material. Respective differential pressure sensors have either a common central diaphragm and two substrates or a common substrate and two diaphragms.

46 Claims, 2 Drawing Sheets

CAPACITIVE PRESSURE SENSOR OR CAPACITIVE DIFFERENTIAL PRESSURE SENSOR

This application claims benefit of Provisional application 60/131,157 filed Apr. 27, 1999.

FIELD OF THE INVENTION

This invention relates to capacitive pressure sensors or capacitive differential pressure sensors.

BACKGROUND OF THE INVENTION

Such a pressure sensor commonly comprises a substrate of ceramic, glass, or single-crystal material (e.g., sapphire) and a diaphragm of ceramic, glass, or single-crystal material (e.g., sapphire) which covers and is spaced from the substrate to form a sensing chamber between the diaphragm and the surface of the substrate facing the diaphragm.

The facing surfaces of the substrate and diaphragm are provided with electrodes, of which every two electrodes lying opposite each other form a capacitor, and which can be deposited by sputtering, for example.

When a pressure of a process medium acts on and deforms the diaphragm, which is elastic, the distance between the electrodes changes, which causes a proportional change in the capacitance of the capacitor. This change in capacitance is an electric signal representative of the pressure, which can be further processed in evaluation electronics.

U.S. Pat. No. 5,050,035, for example, discloses a capacitive pressure sensor comprising:
  a substrate of alumina ceramic having a first major surface and a second major surface as well as a circumferential surface;
  a first electrode of an electrically conductive material on the first major surface;
  a first through connection from the first electrode through the substrate to the second major surface;
  a diaphragm of alumina ceramic which
    is attached to the substrate along a joint by a joining material, and
    is covered, on a surface facing the first electrode, with a second electrode,
      to which contact is made through the joint and via a second through connection from the joint to the second major surface,
    the electrodes, the through connections, and the joining material being a resistive or conductive paste deposited by silk-screen printing.

To measure a difference of two pressures, referred to herein as a "differential pressure", two sensing chambers are commonly used, one for each pressure, the sensing chambers being spatially and mechanically connected with one another and being provided with at least one capacitor each. In this manner, an electric signal can be produced which corresponds to the difference between a pressure acting on one of the sensing chambers and a pressure acting on the other sensing chamber.

Both the deposition of the electrodes by silk-screen printing and the sputter deposition require costly and complicated equipment, the sputtering requiring vacuum apparatus, for example. In addition, both techniques involve the use of masks with which the shapes of the electrodes are defined.

SUMMARY OF THE INVENTION

It is therefore an object of the invention to provide capacitive pressure sensors or capacitive differential pressure sensors wherein the electrodes are formed using a technique other than silk-screen printing or sputtering.

To attain this object, a first variant of the invention provides a capacitive pressure sensor comprising:
  a substrate of ceramic, glass, or single-crystal material having a first major surface and a second major surface as well as a circumferential surface;
  a plate-shaped first electrode of electrically conductive material
    which is secured in a recess in the first major surface in a high-pressure-resistant and high-vacuum-tight manner by a first joining material;
  a through connection from the first electrode through the substrate to the second major surface or the circumferential surface;
  a diaphragm of ceramic, glass, or single-crystal material which
    is attached to the substrate outside the recess along a joint by a second joining material and
    either itself forms a second electrode
    or is covered, on a surface facing the first electrode, with a second electrode,
      to which contact is made through the joint.

To attain the above object, a second variant of the invention comprises a capacitive differential pressure sensor comprising:
  a first substrate of ceramic, glass, or single-crystal material having a first major surface and a second major surface as well as a circumferential surface;
  a plate-shaped first electrode of electrically conductive material
    which is secured in a first recess in the first major surface in a high-pressure-resistant and high-vacuum-tight manner by a first joining material;
  a first through connection from the first electrode through the first substrate to the second major surface or the circumferential surface;
  a second substrate of ceramic, glass, or single-crystal material having a first major surface and a second major surface as well as a circumferential surface;
  a plate-shaped second electrode of electrically conductive material
    which is secured in a second recess in the first major surface of the second substrate in a high-pressure-resistant and high-vacuum-tight manner by the first joining material;
  a second through connection from the second electrode through the second substrate to the second major surface or the circumferential surface of the second substrate;
  a diaphragm of ceramic, glass, or single-crystal material which
    is attached to the first substrate outside the first recess along a first joint by a second joining material,
    is attached to the second substrate outside the second recess along a second joint by the second joining material,
    either itself forms a second electrode
    or is covered, on a surface facing the first electrode, with a third electrode,
      to which contact is made through the first joint,
    is covered, on a surface facing the second electrode, with a fourth electrode,
      to which contact is made through the second joint.

To attain the above object, a third variant of the invention provides a capacitive differential pressure sensor comprising:

a substrate of ceramic, glass, or single-crystal material having a first major surface and a second major surface as well as a circumferential surface;

a plate-shaped first electrode of electrically conductive material
which is secured in a first recess in the first major surface in a high-pressure resistant and high-vacuum-tight manner by a first joining material;

a plate-shaped second electrode of electrically conductive material
which is secured in a second recess in the second major surface in a high-pressure resistant and high-vacuum-tight manner by the first joining material;

a first through connection from the first electrode through the substrate to the circumferential surface;

a second through connection from the second electrode through the substrate to the circumferential surface, said second through connection being separate from the first through connection;

a first diaphragm of ceramic, glass, or single-crystal material which
is attached to the substrate outside the first recess along a first joint by a second joining material and
either itself forms a third electrode
or is covered, on a surface facing the first electrode, with a third electrode,
to which contact is made through the first joint; and a second diaphragm of ceramic, glass, or a single-crystal material which
is attached to the substrate outside the second recess along a second joint by a second joining material and
either itself forms a fourth electrode
or is covered, on a surface facing the second electrode, with a fourth electrode,
to which contact is made through the second joint.

In a first preferred embodiment of the invention, the plate-shaped electrode or the plate-shaped electrodes are made of a metal whose coefficient of thermal expansion is matched to that of the ceramic, glass, or single-crystal material.

In a second preferred embodiment of the invention, the plate-shaped electrode or the plate-shaped electrodes are made of an electrically conductive ceramic or an electrically conductive glass.

In another preferred embodiment of the invention, the electrically conductive ceramic is a cermet.

In a further preferred embodiment of the invention, the electrically conductive ceramic is a dispersive ceramic.

In still another preferred embodiment of the invention, the plate-shaped electrode or plate-shaped electrodes are made of a material selected from the group consisting of silicon carbide, titanium carbide, titanium nitride, titanium diboride, molybdenum disilicide, tungsten carbide, and zirconium carbide.

In a further preferred embodiment of the invention, the electrodes are sintered without the first joining material.

One advantage of the invention over the prior art mentioned above is that holes in the substrate (e.g., for through connections or for oil filling) no longer need be high-pressure-resistant and high-vacuum-tight. Furthermore, diameters of such holes in the substrate can be greater than in the prior-art pressure sensors or differential pressure sensors, so that these holes are easier to form, for example by dry pressing at an unsintered green compact of the substrate.

The invention will become more apparent from the following description of embodiments when taken in conjunction with the accompanying drawings (not to scale). Like parts are designated by like reference characters throughout the figures; for convenience of illustration, reference characters which were already used are not repeated in subsequent figures. In the drawings:

DETAILED DESCRIPTION OF THE PREFERRED EMBODIMENTS

Figure 1:
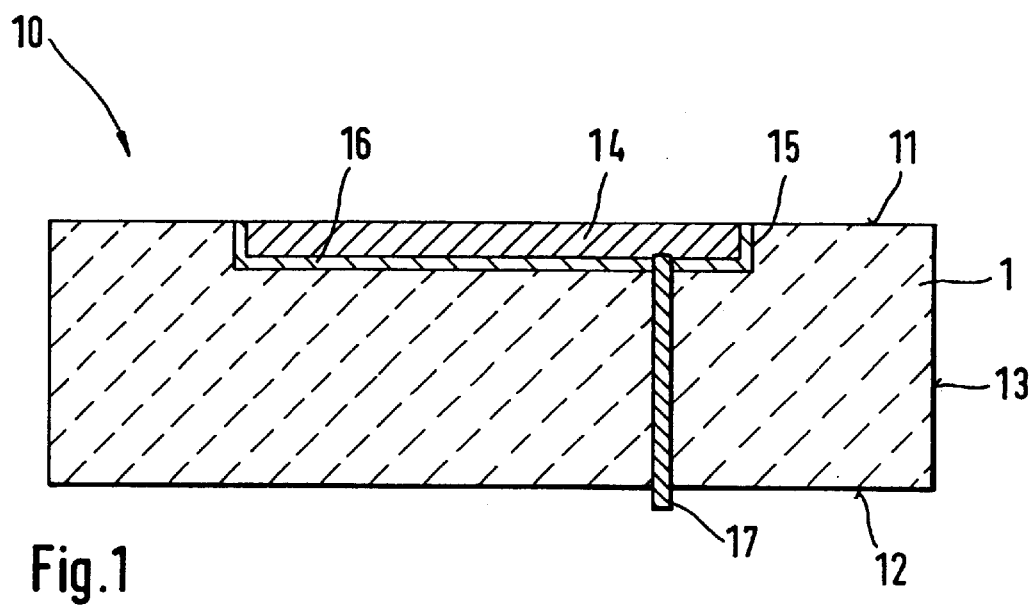
FIG. 1 shows a schematic cross section of a substrate of a capacitive pressure sensor according to the first variant of the invention.

FIG. 1 shows a substrate 1 of a capacitive pressure sensor 10 according to the first variant of the invention in a schematic cross-sectional view. Substrate 1 has a first major surface 11 and a second major surface 12 as well as a circumferential surface 13.

A plate-shaped first electrode 14 of electrically conductive material is secured in a recess 15 in the first major surface 11 in a high-pressure-resistant and high-vacuum-tight manner by a first joining material 16.

A through connection 17 is provided from electrode 14 through substrate 1 to second major surface 12, whereby electrode 14 is made electrically accessible from outside the substrate 1. Instead of leading to surface 12, through connection 17 may extend to circumferential surface 13.

Figure 2:
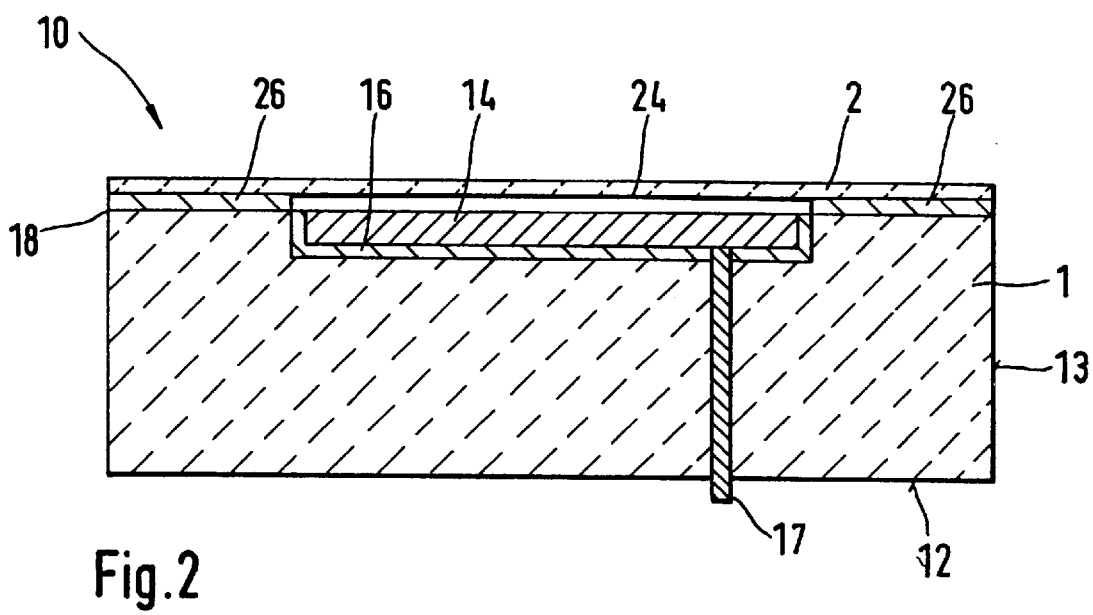
FIG. 2 shows a schematic cross section of the substrate of FIG. 1 with a diaphragm added to form a capactive pressure sensor.

FIG. 2 is a schematic cross-sectional view of the substrate 1 of FIG. 1 with a diaphragm 2 added to form a capacitive pressure sensor 10. Diaphragm 2 is attached to substrate 1 outside recess 15 along a joint 18 by a second joining material 26.

Diaphragm 2 either itself forms a second electrode or is covered with a second electrode 24 on a surface facing first electrode 14. In either case, contact is made to electrode 24 through joint 18; this cannot be illustrated in FIG. 2. Thus, electrode 24, too, is electrically accessible from outside, and the capacitor formed by electrodes 14, 24 can be connected to evaluation electronics.

Figure 3:
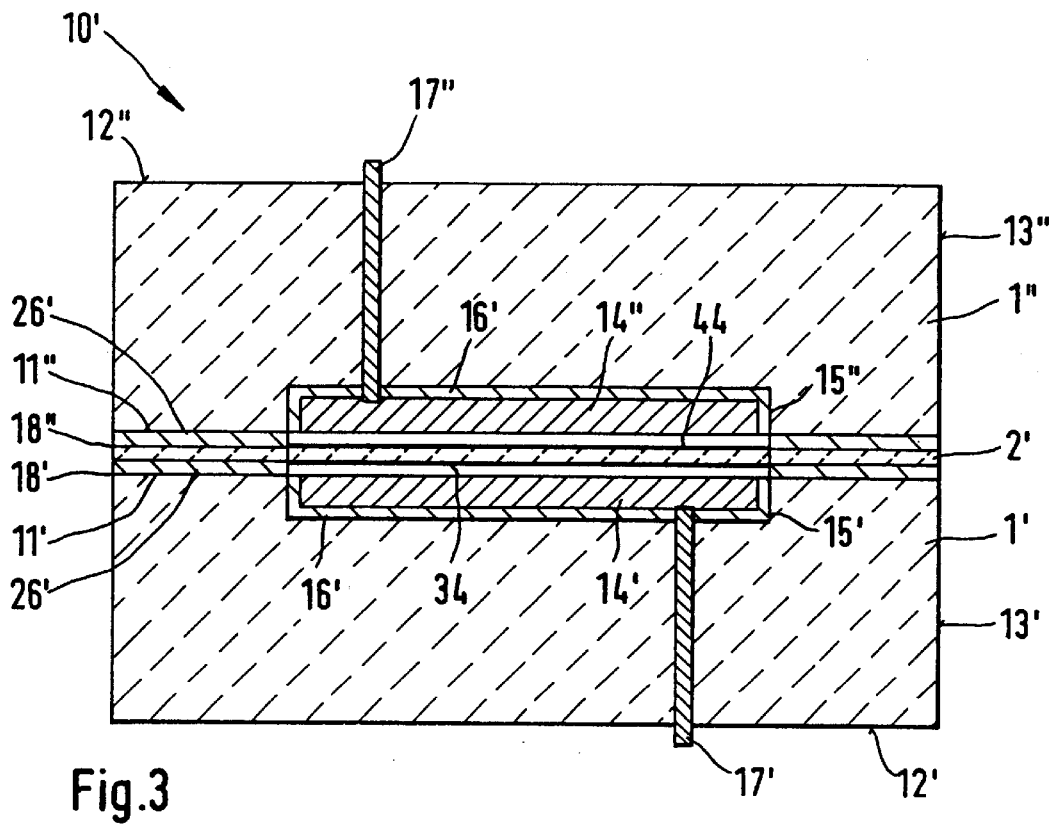
FIG. 3 shows a schematic cross section of a capacitive differential pressure sensor with a single diaphragm and two substrates according to the second variant of the invention.

FIG. 3 is a schematic cross-sectional view of a capacitive differential pressure sensor 10' with a single diaphagm 2' and two substrates 1', 1" according to the second variant of the invention. Each of substrates 1', 1", is made of ceramic, glass, or single-crystal material and has a first major surface 11', 11", a second major surface 12', 12", and a circumferential surface 13', 13".

A plate-shaped first electrode 14' of electrically conductive material is secured in a recess 15' in the first major surface 11' of substrate 1' in a high-pressure-resistant and high-vacuum-tight manner by a first joining material 16'.

"High-pressure-resistant" as used herein means that the joint can withstand pressures up to 500 bar; "high-vacuum tight" as used herein means that the joint is still tight at a vacuum with a pressure of $10^{-12}$ bar.

A through connection 17' is provided from electrode 14' through substrate 1' to second major surface 12', whereby electrode 14' is made electrically accessible from outside. Instead of leading to surface 12', through connection 17' may extend to circumferential surface 13'.

A plate-shaped second electrode 14" of electrically conductive material is secured in a recess 15" in the first major surface 11" of substrate 1" in a high pressure-resistant and high-vacuum-tight manner by the first joining material 16'.

A through connection 17" is provided from electrode 14" through substrate 1" to second major surface 12", whereby electrode 14" is made electrically accessible from outside. Instead of leading to surface 12", through connection 17" may extend to circumferential surface 13". Through connection 17" is not electrically connected with through connection 17.

Diaphragm 2 is attached to substrate 1 outside recess 15' along joint 18' by a second joining material 26'. Diaphragm 2' is attached to substrate 1" outside recess 15" along a joint 18' by the second joining material 26'.

Diaphragm 2' either itself forms a third electrode or is covered with a third electrode 34 on a surface facing first electrode 14' and with a fourth electrode 44 on a surface facing second electrode 14".

In the former case, in which diaphragm 2' itself forms the third electrode, contact is made to the diaphragm through joint 18' and/or through joint 18". In the latter case, in which diaphragm 2' is covered by third electrode 34 and fourth electrode 44, contact is made to electrode through joint 18' and to electrode 44 through joint 18". Thus, the third electrode or the electrodes 34, 44 are also electrically accessible from outside the respective substrates 1', 1" and the capacitors formed by electrode 14' and the third electrode and by electrode 14" and the third electrode or by electrodes 14', 34 and 14", 44 can be connected to evaluation electronics.

Figure 4:
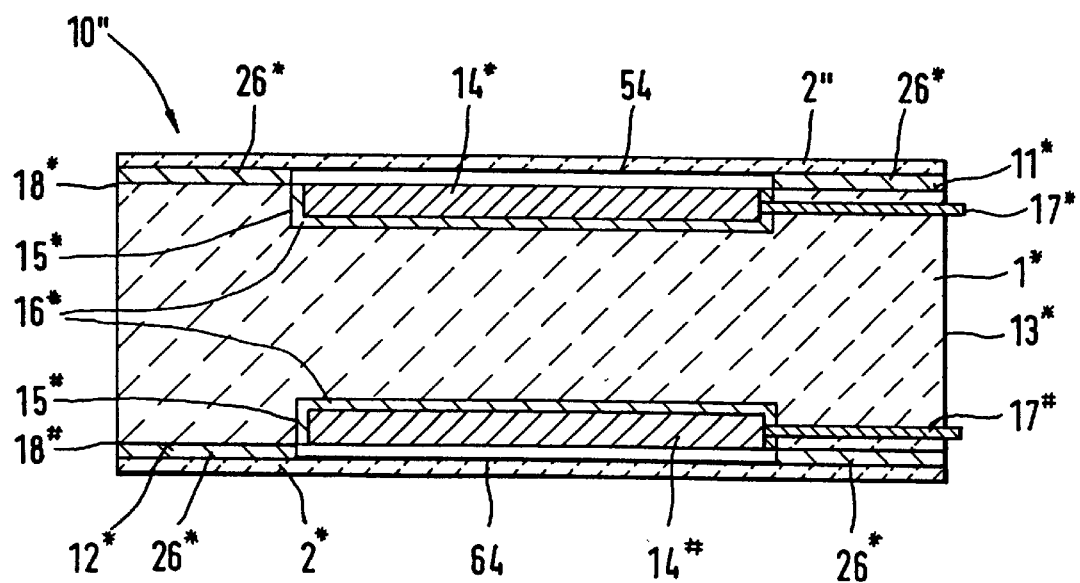
FIG. 4 shows a schematic cross section of a capacitive differential pressure sensor with two diaphragms and a single substrate according to the third variant of the invention.

FIG. 4 shows a schematic cross section of a capacitive differential pressure sensor with two diaphragms 2", 2*, and a single substrate 1* according to the third variant of the invention. Substrate 1* has a first major surface 11* and a second major surface 12* as well as a circumferential surface 13*.

A plate-shaped first electrode 14* of electrically conductive material is secured in a recess 15* in the first major surface 11* in a high-pressure-resistant and high-vacuum-tight manner by a first joining material 16*.

A plate-shaped second electrode 14# of electrically conductive material is secured in a recess 15# in the second major surface 12* in a high-pressure-resistant and high-vacuum-tight manner by the first joining material 16*.

A first through connection 17* is provided from electrode 14* through substrate 1* to circumferential surface 13*, and a second through connection 17# is provided from electrode 14# through substrate 1* to circumferential surface 13*, whereby the respective electrodes 14* and 14# are made electrically accessible from outside the substrate 1*. The two through connections 17*, 17# are electrically isolated from each other.

The first diaphragm 2" is attached to substrate 1* outside recess 15* along a joint 18* by a second joining material 26*. Diaphragm 2" either itself forms a third electrode or is covered by a third electrode 54 on a surface facing first electrode 14*. In either case, contact is made to electrode 54 through joint 18*. Thus, electrode 54 is also electrically accessible from outside the substrate 1* and the capacitor formed by electrodes 14*, 54 can be connected to evaluation electronics.

The second diaphragm 2* is attached to substrate 1* outside recess 15# along a joint 18# by joining material 26*. Diaphragm 2* either itself forms a fourth electrode or is covered by a fourth electrode 64 on a surface facing second electrode 14#. In either case, contact is made to electrode 64 through joint 18#. Thus, electrode 64 is also electrically accessible from outside and the capacitor formed by electrodes 14#, 64 can be connected to evaluation electronics.

In the invention, the substrate or substrates are formed of a ceramic (e.g., an alumina ceramic with 96 wt. % of $Al_2O_3$, a glass, or a single-crystal material. The diaphragm or diaphragms are also formed of one of these materials.

The plate-shaped electrodes 14, 14', 14", 14*, 14# can be formed of a metal whose coefficient of thermal expansion is matched to that of the ceramic or glass. One of the metals: ruthenium, rhodium, palladium, osmium, platinum, tungsten, and molybdenum, or an alloy of these metals can be used, for example.

For the first joining material 16, 16', 16", 16* for the high-pressure-resistant and high-vacuum-tight fixing of such plate-shaped metal electrodes 14, 14', 14", 14*, 14# in the respective recesses 15, 15', 15", 15*, 15# of substrates 1, 1', 1", 1* a metallic solder, such as an active brazing solder, an electrically conductive adhesive, a plastic, or a glass frit can be used.

The plate-shaped electrodes 14, 14', 14", 14*, 14# can also be formed of an electrically conductive ceramic, particularly a cermet; of a dispersive ceramic, silicon carbide, titanium carbide, titanium nitride, titanium diboride, molybdenum disilicide, tungsten carbide, or zirconium carbide; or of an electrically conductive glass.

A cermet is a ceramic containing metal particles in its structure. In a dispersive ceramic, particles of another ceramic, such as titanium carbide, are incorporated in a matrix of a base material, such as an alumina matrix.

Alternatively to the use of the first joining materials 16, 16', 16", 16* mentioned in connection with the plate-shaped metal electrodes 14, 14', 14", 14*, 14#, such plate-shaped electrodes may also be formed by sintering cermet or dispersive ceramic into the respective recesses 15, 15', 15", 15*, 15#. in that case, care should also be taken in the selection of the electrode material to ensure that the thermal expansion coefficient of the latter is optimally matched to that of the substrate material.

Diaphragms 2, 2, 2", 2* may also be attached to the respective substrates by the above joining materials, too.

Through connections 17, 17', 17", 17*, 17# can be implemented, for example, by respective metal pins inserted or sintered into associated holes. Instead of a metal pin, an electrically conductive plastic can be used.

It suffices if the respective through connection 17, 17', 17", 17*, 17# extends through the first joining material 16, 16', 16", 16*, if present, and only slightly into the associated plate-shaped electrode 14, 14', 14", 14*, 14# at the backside thereof; the surface of this electrode facing the associated diaphragm electrode need not be reached, so that this surface has no discontinuity.

In the invention, a plate-shaped electrode 14, 14', 14", 14*, 14# is assumed to be fitted in the associated surface of the substrate 1, 1', 1", 1* in such a way as not to protrude from the surface. If that should not be the case, the protruding portion of the electrode may be ground off.

In the embodiments shown in the figures, the surfaces of the electrodes lying opposite each other are planar, and the respective joining material at the joint or joints also serves to achieve a predetermined and defined distance between the respective diaphragm 2, 2, 2", 2* and the respective substrate 1, 1', 1", 1*, so that the associated electrodes can form the capacitor mentioned above.

The diaphragm 2, 2, 2", 2* and substrate 1, 1', 1", 1* are commonly joined annularly so as to form a hermetically sealed chamber. The latter is evacuated during the joining process, so that an absolute-pressure sensor is obtained.

If a relative-pressure sensor is to be produced or if the sensors are differential pressure sensors, the substrate or each of the substrates will be provided with a bore extending to the chamber or the respective chambers, so that the chamber or chambers can be filled with oil.

The diameter of the bore in the substrate can be greater than the diameter of the associated bore in the plate-shaped electrode, so that the bore in the substrate can be easily formed by dry pressing at the aforementioned green compact. The bore in the plate-shaped electrode can also be formed in this manner.

Since the smallest diameter of a bore formed by dry pressing at a green compact is approximately equal to one tenth the thickness of the green compact, and the electrode is approximately 2 mm thick, very fine bores approximately 0.2 mm in diameter can be formed in a ceramic electrode.

Then, a filler can be fitted in the bore of the green compact to reduce the amount of oil required.

The invention is applicable not only to pressure sensors or differential pressure sensors having electrodes with planar surfaces but also to pressure sensors or differential pressure sensors as are described in copending U.S. patent application Ser. No. 60/129,086 filed Apr. 04, 1999.

The essential feature of those pressure sensors or differential pressure sensors is that the surface of the substrate facing the respective diaphragm is not planar but is provided with a concave area serving as a diaphragm bed, so that the diaphragm and substrate rest on each other and touch along ring-shaped portions of their surfaces. Outside this support area, they are joined up to the circumferential surface of the substrate.

At a maximum permissible pressure, the diaphragm lays itself against the diaphragm bed and is thus protected from bursting at pressures higher than the permissible pressure.

If the invention is used in pressure sensors or differential pressure sensors with the aforementioned diaphragm bed, the diaphragm bed has to be formed in the free surface of the plate-shaped electrode 14, 14', 14", 14*, 14# fitted in the corresponding recess 15, 15', 15", 15*, 15#, for example by grinding, and the diaphragm 2, 2, 2", 2* and substrate 1, 1, 1", 1* have to be joined together outside the ring-shaped support area.

What is claimed is:

1. A capacitive pressure sensor comprising:
    a substrate including at least one of a ceramic, glass, or single-crystal material, the substrate having a generally planar first major surface formed to include a recess, a second major surface, and a circumferential surface;
    a plate-shaped first electrode of electrically conductive material
        which is secured in the recess in the first major surface in a high-pressure-resistant and high-vacuum-tight manner by a first joining material,
        the first electrode including a generally planar outer surface and occupying the recess so that the generally planar outer surface is coplanar with the first major surface of the substrate;
    a through connection from the first electrode through the substrate to one of the second major surface and the circumferential surface;
    a diaphragm including at least one of a ceramic, glass, or single-crystal material,
        the diaphragm being attached to the substrate outside the recess along a joint in spaced relation to the first electrode by a second joining material; and
    a second electrode which is positioned adjacent the first electrode by the diaphragm.

2. The pressure sensor as claimed in claim 1 wherein the plate-shaped electrode is made of a metal whose coefficient of thermal expansion is matched to that of the ceramic, glass, or single-crystal material.

3. The pressure sensor as claimed in claim 1 wherein the plate-shaped electrode is made of an electrically conductive ceramic or an electrically conductive glass.

4. The pressure sensor as claimed in claim 3 wherein the electrically conductive ceramic is a cermet.

5. The pressure sensor as claimed in claim 3 wherein the electrically conductive ceramic is a dispersive ceramic.

6. The pressure sensor as claimed in claim 3 wherein the plate-shaped electrode is made of a material selected from the group consisting of silicon carbide, titanium carbide, titanium nitride, titanium diboride, molybdenum disilicide, tungsten carbide, and zirconium carbide.

7. The pressure sensor as claimed in claim 3 wherein the plate-shaped electrodes is sintered without the first joining material.

8. The pressure sensor as claimed in claim 4 wherein the plate-shaped electrodes is sintered without the first joining material.

9. The pressure sensor as claimed in claim 5 wherein the plate-shaped electrodes is sintered without the first joining material.

10. The pressure sensor as claimed in claim 6 wherein the plate-shaped electrodes is sintered without the first joining material.

11. A capacitive differential pressure sensor comprising:
    a first substrate including at least one of a ceramic, glass, or single-crystal material, the first substrate having a generally planar first major surface formed to include a first recess, a second major surface, and a circumferential surface;
    a plate-shaped first electrode of electrically conductive material
        which is secured in the first recess in the first major surface of the first substrate in a high-pressure-resistant and high-vacuum-tight manner by a first joining material;
        the first electrode including a first generally planar outer surface and occupying the first recess so that the first generally planar outer surface is coplanar with the first major surface of the first substrate;
    a first through connection from the first electrode through the first substrate to one of the second major surface and the circumferential surface of the first substrate;
    a second substrate including at least one of a ceramic, glass, or single-crystal material, the second substrate having a first major surface formed to include a second recess, a second major surface and a circumferential surface;
    a plate-shaped second electrode of electrically conductive material
        which is secured in the second recess in the first major surface of the second substrate in a high-pressureresistant and high-vacuum-tight manner by the first joining material;

the second electrode including a second generally planar outer surface and occupying the second recess so that the second generally planar outer surface is coplanar with the first major surface of the second substrate;

a second through connection from the second electrode through the second substrate to one of the second major surface and the circumferential surface of the second substrate;

a diaphragm including at least one of a ceramic, glass, or single-crystal material which
is attached to the first substrate outside the first recess along a first joint in spaced relation to the first electrode by a second joining material and
is attached to the second substrate outside the second recess along a second joint in spaced relation to the second electrode by the second joining material;

a third electrode on the diaphragm, the third electrode facing the first electrode; and a fourth electrode on the diaphragm, the fourth electrode facing the second electrode.

12. A capacitive differential pressure sensor comprising:

a substrate including at least one of a ceramic, glass, or single-crystal material, the substrate having a generally planar first major surface formed to include a first recess, a second major surface formed to include a second recess, and a circumferential surface;

a plate-shaped first electrode of electrically conductive material
which is secured in the first recess in the first major surface in a high-pressure-resistant and high-vacuum-tight manner by a first joining material,
the first electrode including a first generally planar outer surface and occupying the first recess so that the first generally planar outer surface is coplanar with the first major surface of the substrate;

a plate-shaped second electrode of electrically conductive material
which is secured in the second recess in the second major surface in a high-pressure-resistant and high-vacuum-tight manner by the first joining material,
the second electrode including a second generally planar outer surface and occupying the second recess so that the second generally planar outer surface is coplanar with the second major surface of the substrate;

a first through connection from the first electrode through the substrate to the circumferential surface;

a second through connection from the second electrode through the substrate to the circumferential surface, the second through connection being separate from the first through connection;

a first diaphragm including at least one of a ceramic, glass, or single-crystal material,
the first diaphragm being attached to the substrate outside the first recess along a first joint in spaced relation to the first electrode by a second joining material;

a third electrode which is positioned adjacent the first electrode by the first diaphragm;

a second diaphragm including at least one of a ceramic, glass, or single-crystal material,
the second diaphragm being attached to the substrate outside the second recess along a second joint in spaced relation to the second electrode by the second joining material; and a fourth electrode which is positioned adjacent the second electrode by the second diaphragm.

13. The differential pressure sensor as claimed in claim 2 wherein the plate-shaped electrodes are made of a metal whose coefficient of thermal expansion is matched to that of the ceramic, glass, or single-crystal material.

14. The differential pressure sensor as claimed in claim 2 wherein the plate-shaped electrodes are made of an electrically conductive ceramic or an electrically conductive glass.

15. The differential pressure sensor as claimed in claim 14 wherein the electrically conductive ceramic is a cermet.

16. The differential pressure sensor as claimed in claim 14 wherein the electrically conductive ceramic is a dispersive ceramic.

17. The differential pressure sensor as claimed in claim 14 wherein the plate-shaped electrode is made of a material selected from the group consisting of silicon carbide, titanium carbide, titanium nitride, titanium diboride, molybdenum disilicide, tungsten carbide, and zirconium carbide.

18. The pressure sensor as claimed in claim 14 wherein the plate-shaped electrodes is sintered without the first joining material.

19. The pressure sensor as claimed in claim 15 wherein the plate-shaped electrodes is sintered without the first joining material.

20. The pressure sensor as claimed in claim 16 wherein the plate-shaped electrodes is sintered without the first joining material.

21. The pressure sensor as claimed in claim 17 wherein the plate-shaped electrodes is sintered without the first joining material.

22. The differential pressure sensor as claimed in claim 3 wherein the plate-shaped electrodes are made of a metal whose coefficient of thermal expansion is matched to that of the ceramic, glass, or single-crystal material.

23. The differential pressure sensor as claimed in claim 3 wherein the plate-shaped electrodes are made of an electrically conductive ceramic or an electrically conductive glass.

24. A pressure sensor apparatus comprising:

a substrate including a generally planar first surface formed to include a recess;

an electrically conductive first electrode coupled to the substrate and located within the recess, the first electrode including a generally planar outer surface and occupying the recess so that the generally planar surface is coplanar with the generally planar first surface of the substrate;

a diaphragm adjacent to the first electrode;

an electrically conductive second electrode which is positioned adjacent the first electrode by the diaphragm; and a joining material configured to couple the diaphragm to the substrate so that the diaphragm extends over the recess and is spaced apart from the generally planar first surface of the substrate and from the generally planar outer surface of the first electrode by a predetermined distance, thereby providing a spacing of the predetermined distance between the first and second electrodes.

25. The apparatus of claim 24, wherein the substrate has a first coefficient of thermal expansion, the diaphragm has a second coefficient of thermal expansion, and the first electrode has a third coefficient of thermal expansion, the third coefficient of thermal expansion being matched to at least one of the first coefficient of thermal expansion and the second coefficient of thermal expansion.

26. The apparatus of claim 24, wherein the first electrode includes at least one of an electrically conductive ceramic material and an electrically conductive glass material.

27. The apparatus of claim 24, wherein the first electrode is formed from a cermet material.

28. The apparatus of claim 26, wherein the first electrode is formed from a dispersive ceramic material.

29. The apparatus of claim 26, wherein the first electrode includes a material selected from the group consisting of silicon carbide, titanium carbide, titanium nitride, titanium diboride, molybdenum disilicide, tungsten carbide, and zirconium carbide.

30. The apparatus of claim 24, wherein the first electrode is sintered to the substrate.

31. The capacitive pressure sensor of claim 1, wherein the diaphragm forms the second electrode.

32. The capacitive differential pressure sensor of claim 11, wherein the diaphragm forms the third electrode.

33. The capacitive differential pressure sensor of claim 12, wherein the first diaphragm forms the third electrode.

34. The capacitive differential pressure sensor of claim 12, wherein the second diaphragm forms the fourth electrode.

35. The pressure sensor as claimed in claim 1, wherein the diaphragm is the second electrode.

36. The pressure sensor as claimed in claim 1, wherein the diaphragm is at least partially covered by the second electrode.

37. The pressure sensor as claimed in claim 11, wherein the diaphragm is at least one of the third electrode and the fourth electrode.

38. The pressure sensor as claimed in claim 11, wherein the diaphragm is the third electrode and the fourth electrode.

39. The pressure sensor as claimed in claim 11, wherein the diaphragm is at least partially covered by at least one of the third electrode and the fourth electrode.

40. The pressure sensor as claimed in claim 11, wherein the diaphragm is at least partially covered by the third electrode and the diaphragm is at least partially covered by the fourth electrode.

41. The pressure sensor as claimed in claim 12, wherein the first diaphragm is the third electrode.

42. The pressure sensor as claimed in claim 12, wherein the first diaphragm is at least partially covered by the third electrode.

43. The pressure sensor as claimed in claim 12, wherein the second diaphragm is the fourth electrode.

44. The pressure sensor as claimed in claim 12, wherein the second diaphragm is at least partially covered by the fourth electrode.

45. The pressure sensor as claimed in claim 24, wherein the diaphragm is the second electrode.

46. The pressure sensor as claimed in claim 24, wherein the diaphragm is at least partially covered by the second electrode.

* * * * *